United States Patent
Sasaki

(10) Patent No.: US 7,426,165 B2
(45) Date of Patent: *Sep. 16, 2008

(54) METHOD AND APPARATUS OF RECORDING INFORMATION IN REDUCED WAITING TIME

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 524 days.

This patent is subject to a terminal disclaimer.

(21) Appl. No.: 10/632,968

(22) Filed: Aug. 4, 2003

(65) Prior Publication Data

US 2004/0057366 A1 Mar. 25, 2004

(30) Foreign Application Priority Data

Sep. 19, 2002 (JP) ............................. 2002-272372
May 6, 2003 (JP) ............................. 2003-127890

(51) Int. Cl.
*G11B 7/00* (2006.01)

(52) U.S. Cl. .................................. 369/53.34

(58) Field of Classification Search .............. 369/47.53, 369/53.34
See application file for complete search history.

(56) References Cited

U.S. PATENT DOCUMENTS

| | | | | |
|---|---|---|---|---|
| 6,172,955 | B1 * | 1/2001 | Hashimoto | 369/53.37 |
| 6,665,724 | B2 * | 12/2003 | Lawrence | 709/230 |
| 2002/0024902 | A1 | 2/2002 | Sasaki | |
| 2002/0114245 | A1 | 8/2002 | Sasaki | |
| 2002/0159353 | A1 * | 10/2002 | Sasaki | 369/53.15 |
| 2003/0033475 | A1 | 2/2003 | Sasaki | |
| 2003/0133369 | A1 | 7/2003 | Sasaki | |
| 2003/0163638 | A1 | 8/2003 | Sasaki | |

FOREIGN PATENT DOCUMENTS

| | | |
|---|---|---|
| EP | 0712130 A1 | 5/1996 |
| EP | 0 878 799 A2 | 11/1998 |
| EP | 8 899 735 A2 | 3/1999 |
| EP | 0 878 799 A3 | 11/2000 |
| EP | 1182661 A2 | 2/2002 |
| EP | 1 229 534 A2 | 8/2002 |
| EP | 1 282 128 A1 | 2/2003 |
| EP | 1329893 A2 | 7/2003 |

(Continued)

OTHER PUBLICATIONS

DVD + RW Promoters et al, "DVD + ReWritable Multi-Media Command Set Description for the DVD-+RW Format, Draft Version 0.4c", Internet Citation, [online], Oct. 30, 2000, XP002310605 Retrieved from the Internet: URL: Eindhoven, NL, htpp//www.t10.org/ftp/t10/document.00/00-417r0.pdf> [retrieved on Dec. 14, 2004], p. 8, pp. 13-25.

*Primary Examiner*—Gautam R Patel
(74) *Attorney, Agent, or Firm*—Dickstein Shapiro LLP

(57) ABSTRACT

A method, apparatus and computer-readable recording medium are disclosed, for recording information in an information recording medium. The method includes a first step of outputting, in response to an initialization request for initializing the information recording medium, termination information indicative of termination of the initialization before the initialization starts, and a second step of starting the initialization at a predetermined timing after the output of the termination information. In this procedure, it is possible to start to record data in a blank disc sooner than in conventional methods.

20 Claims, 8 Drawing Sheets

FOREIGN PATENT DOCUMENTS

| | | | |
|---|---|---|---|
| JP | 4178965 A * | 6/1991 | |
| JP | H09-073720 | 3/1997 | |
| JP | H11-134799 | 5/1999 | |
| JP | 2001-43663 | 2/2001 | |
| JP | 2001-076421 | 3/2001 | |

* cited by examiner

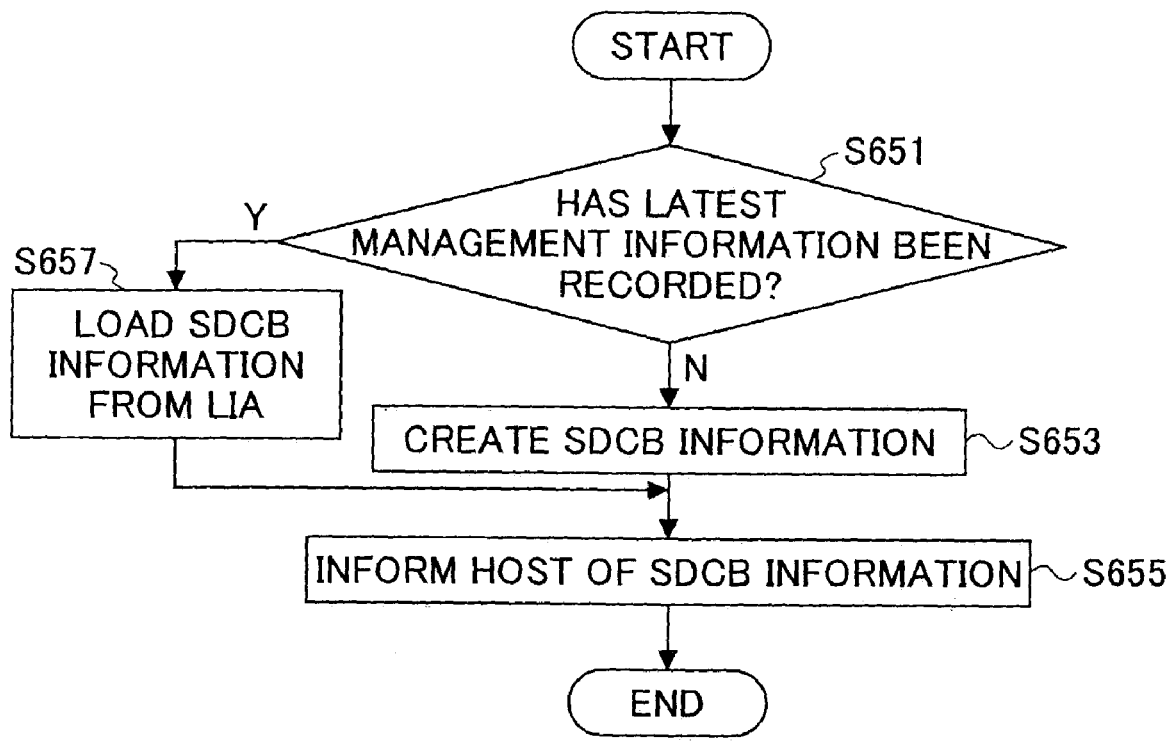

METHOD AND APPARATUS OF RECORDING INFORMATION IN REDUCED WAITING TIME

CROSS-REFERENCE TO RELATED APPLICATIONS

The present application is based on Japanese Patent Applications Nos. JP 2002-272372, filed Sep. 19, 2002, and JP 2003-127890, filed May 6, 2003, the entire contents of which are hereby incorporated by reference.

BACKGROUND OF THE INVENTION

1. Field of the Invention

The present invention generally relates to a method of recording information in an information recording medium, an apparatus to implement the method, and a computer-readable recording medium for storing a program to cause a computer to implement the method.

2. Description of the Related Art

Recent functional improvements in personal computers (PC) make it possible to deal more easily with audio and visual information such as music and images. Emergence of personal computers that incorporate a receiver for receiving TV programs or radio programs accelerates developments of optical discs, such as a DVD+R (Digital Versatile Disc+Recordable) and a DVD+RW (Digital Versatile Disc+ReWritable), suitable for storing a large amount of broadcast content information. As such an optical disc is now more affordable, an optical disc apparatus, which serves as an information recorder for the optical disc, is more widely used. In addition, each of a DVD+R and a DVD+RW is compatibile with a currently widespread DVD-ROM (Digital Versatile Disc+ Read Only Memory). In other words, a conventional DVD-ROM drive apparatus can properly reproduce information recorded in a DVD+R and a DVD+RW.

In order to establish this compatibility with a DVD-ROM, in particular, a DVD+RW has to be formatted to record dummy data in advance in the entire recorded area or a designated portion thereof. In general, it takes a long processing time to complete this formatting process. For this reason, a DVD+RW is conventionally formatted using a background formatting method. In accordance with the background formatting method, when a user requests a formatting process for a DVD+RW, only predetermined management information is recorded in a portion of the lead-in area of the DVD+RW (initialization). Then, the user is informed that the formatting process has been completed, although the entire formatting process has not actually been completed yet, and is allowed to record and reproduce information in the DVD+RW. Then, while the user is not accessing the DVD+RW, dummy data are recorded in the remaining recorded area so as to complete the entire formatting process.

Japanese Laid-Open Patent Application No. 2001-043663, which was presented by the present inventor, discloses an invention for recording and reproducing an optical disc in an information recording apparatus. In the disclosed apparatus, when a user requests the apparatus to record or reproduce desired information during initialization, the apparatus temporarily halts the initialization and records the information. Accordingly, the apparatus makes it possible to make a newly purchased optical disc (a blank disc) recordable sooner than conventional methods because the apparatus can start to record information without completion of the initialization.

According to the disclosed apparatus, however, after the user inserts a blank disc into the apparatus so as to record desired data (user data), it is necessary for the user to wait for the time required to record at least predetermined management information in the lead-in area of the optical disc before being allowed to start recording user data. Thus, for example, even if the user attempts to record a currently broadcast TV program in a DVD+RW, the apparatus is not capable of recording the TV program immediately. In this case, there is a risk that the apparatus cannot record a desired portion of the TV program.

On the other hand, user data are also not allowed to be recorded in a DVD+R until predetermined management information is recorded in a portion of the lead-in area of the DVD+R. Thus, it is necessary for a user to wait for the time required to record at least predetermined management information in a portion of the lead-in area before the user data may start to be recorded. Accordingly, even if the user attempts to record a currently broadcast TV program in a DVD+R, the apparatus is not capable of recording the TV program immediately, as in the above-mentioned DVD+RW. In this case, there is a risk that the apparatus cannot record a desired portion of the TV program.

SUMMARY OF THE INVENTION

It is a general object of the present invention to provide a method and apparatus of recording information in an information recording medium in which one or more of the above-mentioned problems are eliminated.

A more specific object of the present invention is to provide a method of recording information with a reduced waiting time before user information is allowed to be recorded, an apparatus to implement the method, and a computer-readable recording medium for storing a program to cause a computer to implement the method.

In order to achieve the above-mentioned objects, there is provided according to one aspect of the present invention a method of recording information in an information recording medium, the method including: a first step of outputting, in response to an initialization request for initializing the information recording medium, termination information indicative of termination of the initialization before the initialization starts; and a second step of starting the initialization at a predetermined timing after the output of the termination information.

In an embodiment of the present invention, the initialization may include a formatting process and the predetermined timing may be a receipt time of a format interrupt request of the information recording medium.

In an embodiment of the present invention, the predetermined timing may be a receipt time of an ejection request of the information recording medium.

In an embodiment of the present invention, the predetermined timing may be a time at which access to the information recording medium is not requested.

In an embodiment of the present invention, the method may further include: a third step of creating, in response to an initialization information request for requesting information regarding the initialization before completion of the initialization, provisional information corresponding to the information regarding the initialization and providing the provisional information in response to the initialization information request.

In an embodiment of the present invention, the method may further include: a fourth step of interrupting the initialization in response to a write request for recording user data in the information recording medium; and a fifth step of restarting the initialization after the user data have been recorded in the information recording medium.

In an embodiment of the present invention, the second step may record predetermined management information in a lead-in area of the information recording medium.

In an embodiment of the present invention, the information recording medium may comply with a DVD+RW standard.

Additionally, there is provided according to another aspect of the present invention a method of recording information in an information recording medium, the method including: a first step of recording, in response to a write request for recording user data in the information recording medium accompanied by recording of management information, the user data before the recording of the management information; and a second step of recording the management information after the user data have been recorded.

In an embodiment of the present invention, the method may further include: a third step of creating, in response to a management information request for requesting the management information before completion of the recording of the management information, provisional information corresponding to the management information and providing the provisional information in response to the management information request.

In an embodiment of the present invention, the information recording medium may comply with a DVD+R standard.

Additionally, there is provided according to another aspect of the present invention an apparatus for recording information in an information recording medium, the apparatus including: a termination information output part, in response to an initialization request for initializing the information recording medium, outputting termination information indicative of termination of the initialization before the initialization starts; and an initialization part starting the initialization by recording predetermined initialization information in a predetermined area in the information recording medium at a predetermined timing after the output of the termination information.

In an embodiment of the present invention, the initialization request may be issued by an external apparatus.

In an embodiment of the present invention, the apparatus may further include: a response part, in response to the initialization information request before completion of the initialization, creating provisional information corresponding to the initialization information and providing the provisional information in response to the initialization information request.

In an embodiment of the present invention, the initialization information request may be issued by an external apparatus.

In an embodiment of the present invention, the apparatus may further include: an initialization interruption part interrupting the initialization in response to a write request for recording user data in the information recording medium; and an initialization restart part restarting the initialization after the user data have been recorded in the information recording medium.

In an embodiment of the present invention, the write request may be issued by an external apparatus.

Additionally, there is provided according to another aspect of the present invention an apparatus for recording information in an information recording medium, the apparatus including: a user data recording part, in response to a write request for recording user data in the information recording medium accompanied by recording of management information, recording the user data before the recording of the management information; and a management information recording part recording the management information after the user data have been recorded.

In an embodiment of the present invention, the write request may be issued by an external apparatus.

In an embodiment of the present invention, the apparatus may further include: a response part, in response to a management information request for requesting the management information before completion of the recording of the management information, creating provisional information corresponding to the management information and providing the provisional information in response to the management information request.

In an embodiment of the present invention, the management information request may be issued by an external apparatus.

The above-mentioned method and apparatus can be implemented through a program, which is stored in a computer-readable recording medium, to cause a computer to execute a procedure for implementing the method and the apparatus.

According to one aspect of the present invention, it is possible to reduce a waiting time before user data are allowed to start to be recorded in an information recording medium.

Other objects, features and advantages of the present invention will become more apparent from the following detailed description when read in conjunction with the accompanying drawings.

BRIEF DESCRIPTION OF THE DRAWINGS

FIG. 9 is a flowchart of an operation of the optical disc apparatus according to the second embodiment of the present invention in response to a SDCB information request command.

DETAILED DESCRIPTION OF THE PREFERRED EMBODIMENTS

In the following, embodiments of the present invention are described with reference to the accompanying drawings.

A description will now be given, with reference to FIG. 1 through FIG. 7, of an optical disc apparatus according to a first embodiment of the present invention.

Figure 1:
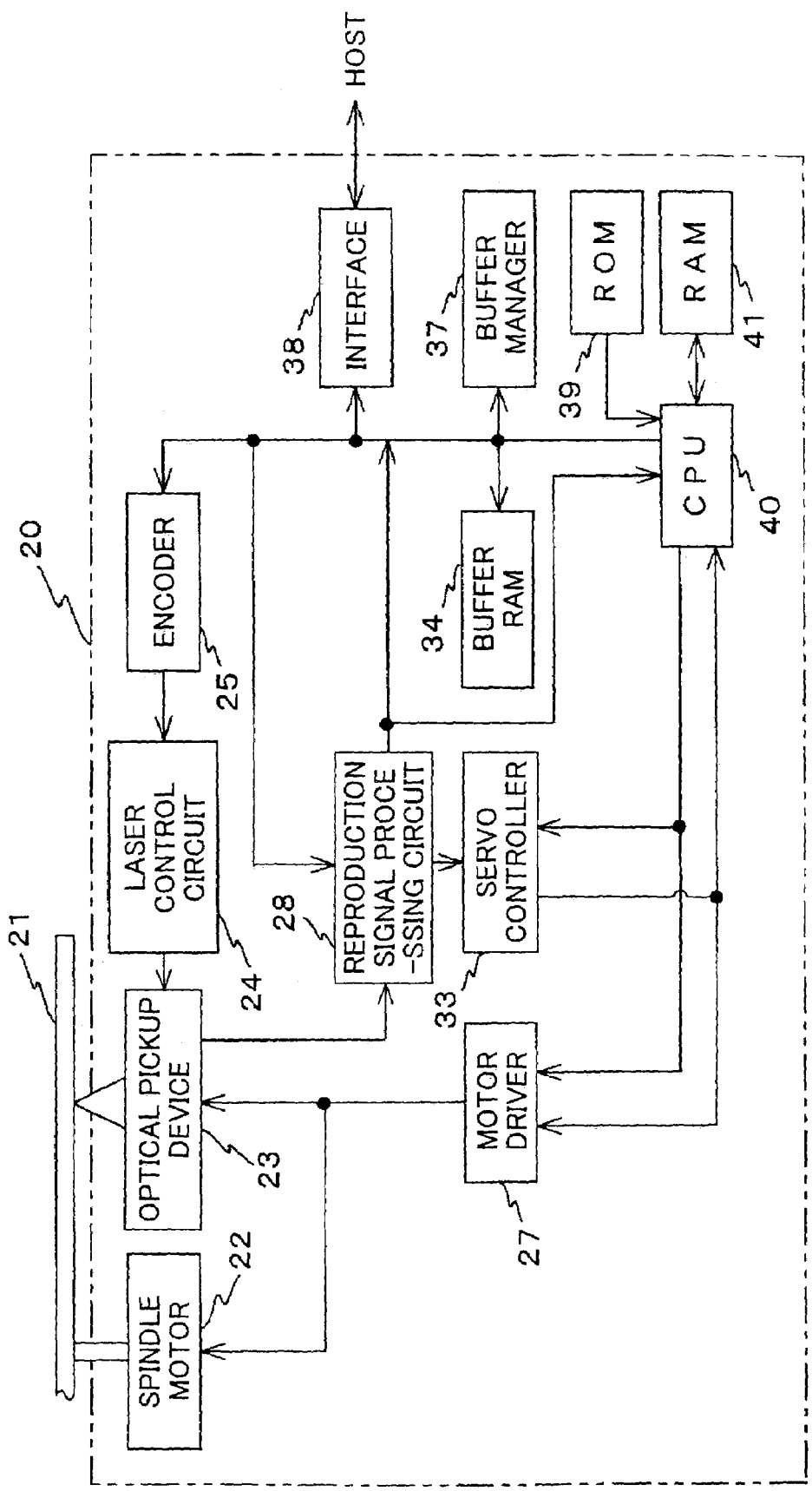
FIG. 1 is a block diagram illustrating a structure of an optical disc apparatus to which a method according to the present invention is applied.

FIG. 1 shows a structure of an optical disc apparatus 20, which serves as an information recorder, according to the first embodiment of the present invention. Referring to FIG. 1, the optical disc apparatus 20 comprises a spindle motor 22 for rotating an optical disc 21, an optical pickup device 23, a laser control circuit 24, an encoder 25, a motor driver 27, a reproduction signal processing circuit 28, a servo controller 33, a buffer RAM 34, a buffer manager 37, an interface 38, a ROM (Read Only Memory) 39, a CPU (Central Processing Unit) 40 and a RAM (Random Access Memory) 41. Here, (solid) connection lines illustrated in FIG. 1 indicate flows of signals and data. It is noted that these connection lines do not represent all connections between components of the optical disc apparatus 20 in FIG. 1. Also, the optical disc apparatus 20 can access an information recording medium in compliance with a DVD+RW standard or a DVD+R standard. In the first embodiment, it is supposed that the optical disc 21 complies with the DVD+RW standard.

The optical pickup device 23 comprises a semiconductor laser, an optical system, a receiver and a driving system, which are not illustrated. The semiconductor laser serves as an illuminant to emit a laser beam. The optical system guides the laser beam onto the recorded surface of the optical disc 21. After the laser beam is reflected on the recorded surface, the optical system further guides the reflected laser beam to a predetermined receiving position. The receiver receives the reflected laser beam and generates a signal corresponding to the amount of energy of the received laser beam. Then, the generated signal is supplied to the reproduction signal processing circuit 28. The driving system comprises a focusing actuator, a tracking actuator and a seek motor, which are not illustrated.

The reproduction signal processing circuit 28 extracts a wobble signal, an RF signal and a servo signal (a focusing error signal, a tracking error signal and so on) from an output signal of the optical pickup device 23. In addition, the reproduction signal processing circuit 28 extracts ADIP (Address In Pregroove) information and a synthesizing signal and so on from the wobble signal. The reproduction signal processing circuit 28 supplies the ADIP information and the synthesizing signal to the CPU 40 and the encoder 25, respectively. After performing a decoding process and an error correction process on the RF signal, the reproduction signal processing circuit 28 stores the resulting signal in the buffer RAM 34 via the buffer manager 37. Also, the reproduction signal processing circuit 28 supplies the focusing error signal and the tracking error signal to the servo controller 33.

The servo controller 33 generates a control signal for controlling the focusing actuator of the optical pickup device 23 based on the focusing error signal. Also, the servo controller 33 generates a control signal for controlling the tracking actuator of the optical pickup device 23 based on the tracking error signal. The servo controller 33 supplies these control signals to the motor driver 27.

The buffer manager 37 manages input/output of data to/from the buffer RAM 34. When the amount of accumulated data reaches a predetermined amount, the buffer manager 37 informs the CPU 40 of this fact.

The motor driver 27 drives the focusing actuator and the tracking actuator of the optical pickup device 23 based on the control signals from the servo controller 33. Based on an instruction from the CPU 40, the motor driver 27 also controls the spindle motor 22 so as to make the linear speed of the optical disc 21 constant. In addition, the motor driver 27 drives the seek motor of the optical pickup device 23 based on an instruction from the CPU 40 so as to adjust the position of the optical pickup device 23 with respect to the sled direction thereof.

The encoder 25 fetches data to be recorded from the buffer RAM 34 via the buffer manager 37 based on an instruction from the CPU 40. Then, the encoder 25 performs some processes such as data modulation and attachment of error correction code on the data so as to generate a write signal for the optical disc 21. The encoder 25 supplies the write signal to the laser control circuit 24 in synch with the synchronizing signal from the reproduction signal processing circuit 28.

The laser control circuit 24 controls an output level of the semiconductor laser of the optical pickup device 23 based on the write signal from the encoder 25 and an instruction from the CPU 40.

The interface 38 serves as a bidirectional communication interface between the optical disc apparatus 20 and a host such as a personal computer. The interface 38 operates in compliance with a standard interface such as ATAPI (AT Attachment Packet Interface) and SCSI (Small Computer System Interface).

The ROM 39 maintains a program to be explained below (hereinafter referred to as a first recording control program) described as code executable by the CPU 40. When the optical disc apparatus 20 is switched ON, the first recording control program in the ROM 39 is loaded into the main memory (not illustrated) of the optical disc apparatus 20, and the CPU 40 controls the above-mentioned individual components in accordance with the first recording control program and temporarily stores data necessary for the control in the RAM 41.

A description will now be given, with reference to FIG. 2 and FIG. 3, of an exemplary structure of the optical disc 21.

Figure 2:
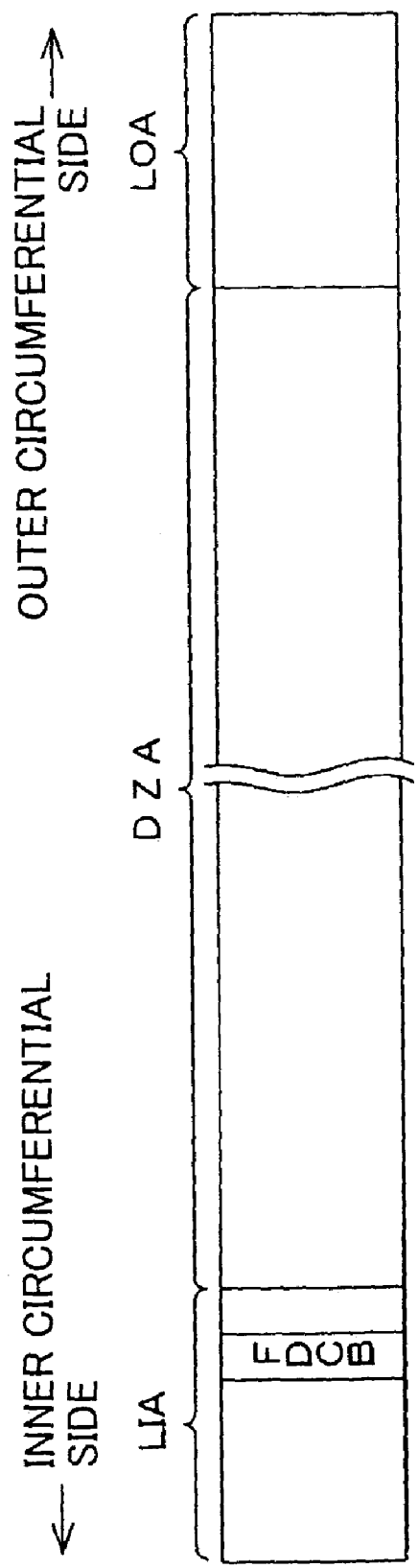
FIG. 2 is a diagram for explaining a structure of a recorded area of a DVD+RW.

FIG. 2 is a diagram illustrating an exemplary recorded area of the optical disc (DVD+RW) 21 in compliance with a DVD+RW standard. Referring to FIG. 2, the recorded area is divided into three areas: a lead-in area (LIA), a data area (DZA) and a lead-out area (LOA), which are ordered from the inner circumferential side to the outer circumferential side. Given user data are recorded in the DZA of the optical disc 21. In FIG. 2, the track of the optical disc 21 is schematically illustrated as a straight line for convenience although the track is actually provided as a spiral line. The left-hand side in FIG. 2 corresponds to the inner circumferential side of the optical disc 21, and the right-hand side in FIG. 2 corresponds to the outer circumferential side of the optical disc 21.

Figure 3:
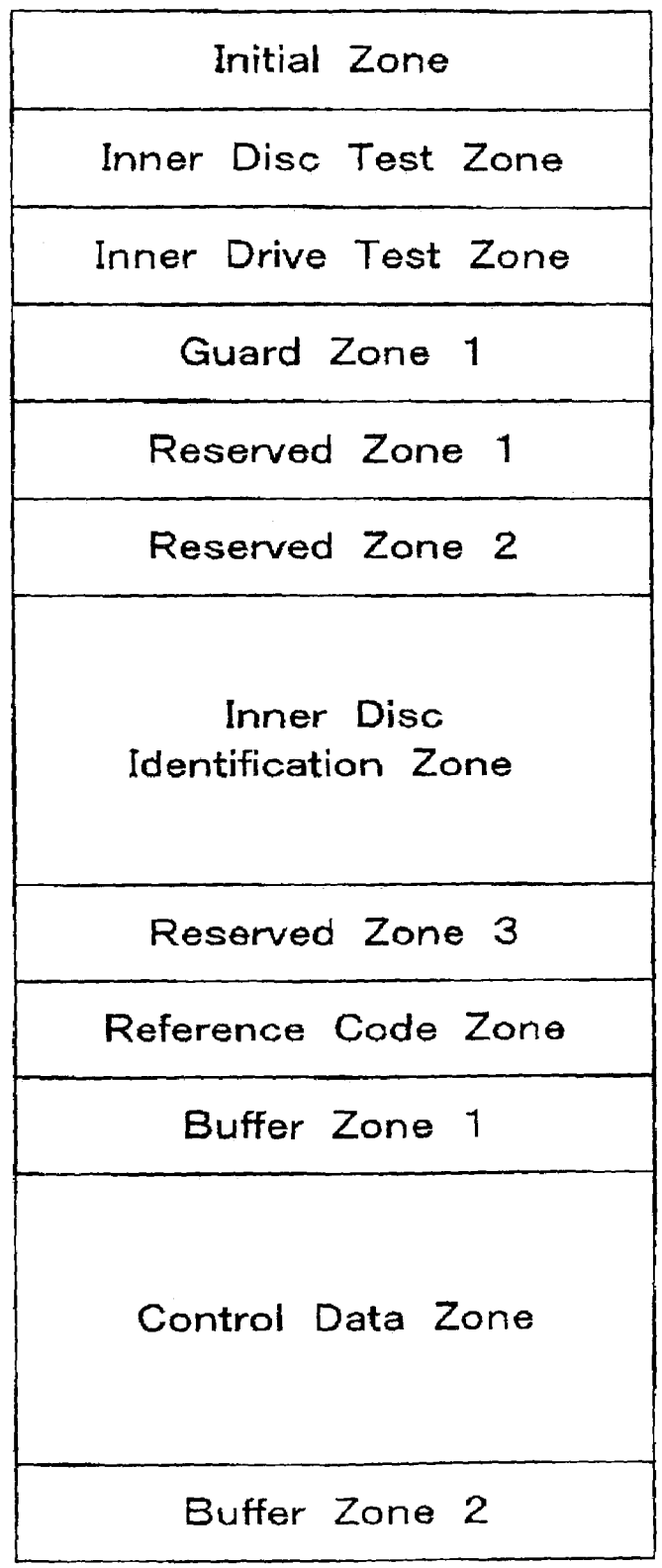
FIG. 3 is a diagram for explaining a structure of a lead-in area of the DVD+RW in FIG. 2.

FIG. 3 is a diagram illustrating an exemplary LIA of the optical disc (DVD+RW) 21. Referring to FIG. 3, the LIA occupies the addresses 01D830 through 030000 and comprises 12 zones: an initial zone, an inner disc test zone, an inner drive test zone, a guard zone 1, a reserved zone 1, a reserved zone 2, an inner disc identification zone, a reserved zone 3, a reference code zone, a buffer zone 1, a control data zone and a buffer zone 2. In the inner disc identification zone, a formatting disc control block (FDCB), in which formatting status and data recording status are described in a bitmap manner, is recorded. Also, in the control data zone, physical format information, which includes start address information and end address information of the DZA, is recorded. Here, addresses of the optical disc 21 are described in a hexadecimal form.

A description will now be given, with reference to FIG. 4 and FIG. 5, of an exemplary operation of the optical disc apparatus 20 in response to receipt of a format unit command, which is for requesting formatting of the optical disc 21, from the host. When the optical disc apparatus 20 receives the format unit command, the optical disc apparatus 20 sets the head address of a program corresponding to a procedure illustrated in FIG. 4 and FIG. 5 to a program counter of the CPU 40 and starts execution of the program. In this embodiment, it is assumed that a blank disc is used as the optical disc 21.

Figure 4:
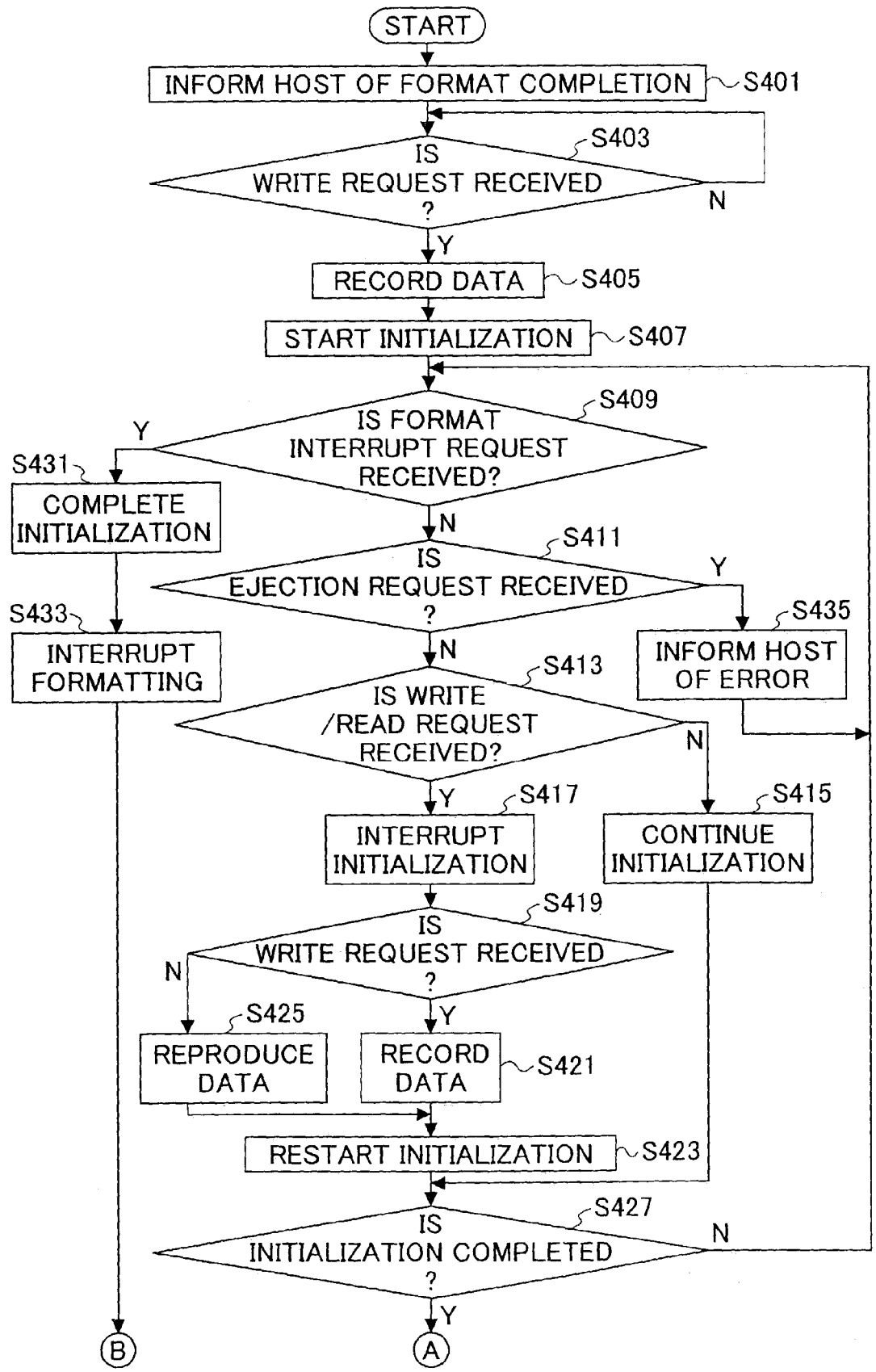
FIG. 4 is a portion of a flowchart of an operation of an optical disc apparatus according to a first embodiment of the present invention in response to receipt of a format request command.
Figure 5:
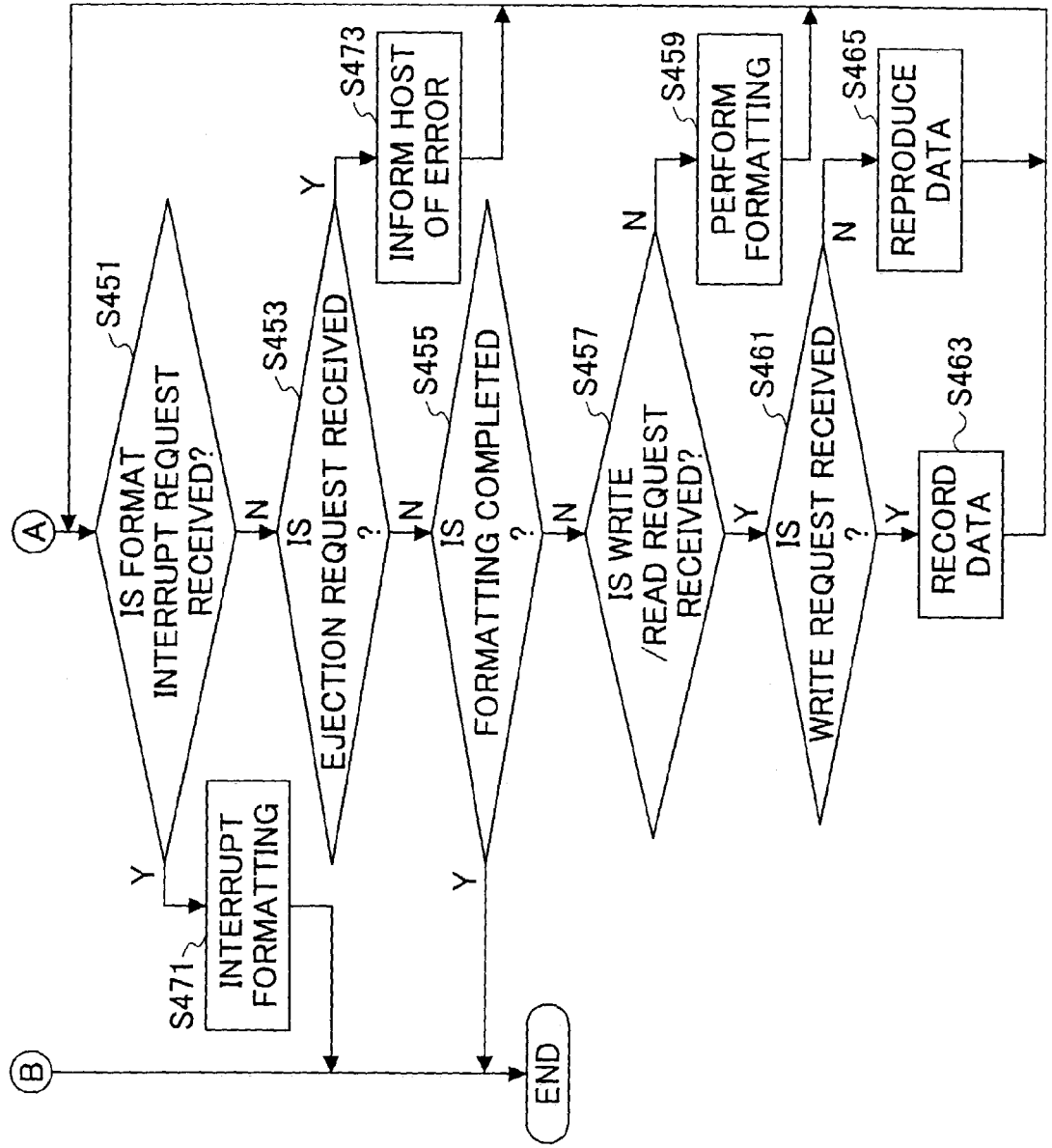
FIG. 5 is the remaining portion of the flowchart of the operation of the optical disc apparatus according to the first embodiment of the present invention in response to receipt of a format request command.

FIG. 4 and FIG. 5 provide a flowchart of an operation of the optical disc apparatus 20 in response to receipt of a format unit command. Referring to FIG. 4, format completion information, which indicates that the optical disc 21 has been properly formatted, is sent to the host at step S401. Accordingly, the optical disc apparatus 20 can currently receive a write request and a read request. At the same time, the optical disc apparatus 20 sets "0"s in a format interrupt request flag, an ejection request flag, a write request flag and a read request flag so as to initialize these flags. Here, the format interrupt request flag is used to indicate whether or not the optical disc apparatus 20 is requested to interrupt formatting of the optical disc 21. The ejection request flag is used to indicate whether or not the optical disc apparatus 20 is requested to eject the optical disc 21. The write request flag is used to indicate whether or not the optical disc apparatus 20 is requested to record data in the optical disc 21. The read request flag is used to indicate whether or not the optical disc apparatus 20 is requested to reproduce data in the optical disc 21. In this embodiment, the optical disc apparatus 20 communicates with the host in terms of both transmission and receipt in accordance with an interrupt process. In response to receipt of a "close track/session command" as the format interrupt request from the host, the optical disc apparatus 20 sets a "1" to the format interrupt request flag under the interrupt process. In response to receipt of a "start/stop unit command" for the ejection request, the optical disc apparatus sets a "1" to the ejection request flag under the interrupt process. In response to receipt of a "write command" for the write request, the optical disc apparatus 20 sets a "1" to the write request flag under the interrupt process. In response to receipt of a "read command" for the read request, the optical disc apparatus 20 sets a "1" to the read request flag under the interrupt process.

At step S403, the optical disc apparatus waits for a write request. If the optical disc apparatus 20 recognizes that the write request flag is set as "1" with reference to the write request flag (step S403: Y), the optical disc apparatus moves to step S405.

At step S405, after resetting the write request flag as "0", the optical disc apparatus 20 records given user data in a designated area in the DZA. The write process of the optical disc apparatus 20 is described in detail below. After recording the user data, the optical disc apparatus 20 moves to step S407.

At step S407, the optical disc apparatus 20 starts to record predetermined management information in a portion of the LIA of the optical disc 21 for the purpose of disc initialization of the optical disc 21. In this disc initialization, the optical disc apparatus 20 records just 16 sectors of the management information at step S407 and then moves to step S409. In disc initialization of a DVD+RW, the predetermined management information is recorded in the addresses 02DC80 through 030000, that is, a guard zone 1, a reserved zone 1, a reserved zone 2, an inner disc identification zone, a reserved zone 3, a reference code zone, a buffer zone 1, a control data zone and a buffer zone 2 (FIG. 3).

At step S409, the optical disc apparatus 20 determines whether or not the optical disc apparatus 20 receives a format interrupt request from the host. For this determination, the optical disc apparatus 20 refers to the format interrupt request flag, and if the format interrupt request flag is not set as "1", the optical disc apparatus determines that the format interrupt is not requested (S409: N) and moves to step S411.

At step S411, the optical disc apparatus 20 determines whether or not the optical disc apparatus 20 receives an ejection request from the host. For this determination, the optical disc apparatus 20 refers to the ejection request flag, and if the ejection request flag is set as "0", the optical disc apparatus 20 determines that the ejection is not requested (step S411: N) and moves to step S413.

At step S413, the optical disc apparatus 20 determines whether or not the optical disc apparatus 20 receives a write request or a read request from the host. For this determination, the optical disc apparatus 20 refers to the write request flag and the read request flag, and if both of them are set as "0"s, the optical disc apparatus 20 determines that the optical disc apparatus 20 has not received the write request or the read request for the optical disc 21 (step S413: N) and moves to step S415.

At step S415, the optical disc apparatus 20 continues the above-mentioned disc initialization. After completing the recording of another 16 sectors of the predetermined management information, the optical disc apparatus 20 moves to step S427.

At step S427, the optical disc apparatus 20 determines whether or not the disc initialization is completed. Namely, it is determined whether or not the predetermined management information is recorded in the addresses 02DC80 through 030000. At step S427 in the first iteration of steps S409, S411, S413, S415 and S427, just 32 sectors of the predetermined management information are recorded in the optical disc 21. Thus, it is determined that the disc initialization is not completed at this time, and the optical disc apparatus 20 returns to step S409.

In order to complete the disc initialization, the optical disc apparatus 20 repeats the above-mentioned steps S409, S411, S413, S415 and S427 until all of determination steps S409, S411, S413 and S427 are satisfied.

On the other hand, if the format interrupt request flag is set as "1", the optical disc apparatus 20 determines that the format interrupt is requested (step S409: Y) and moves to step S431.

At step S431, the optical disc apparatus 20 attempts to complete the disc initialization. Namely, the optical disc apparatus 20 records the remaining portion of the predetermined management information in a predetermined address. Then, after completion of the disc initialization, the optical disc apparatus 20 moves to step S433.

Figure 6:
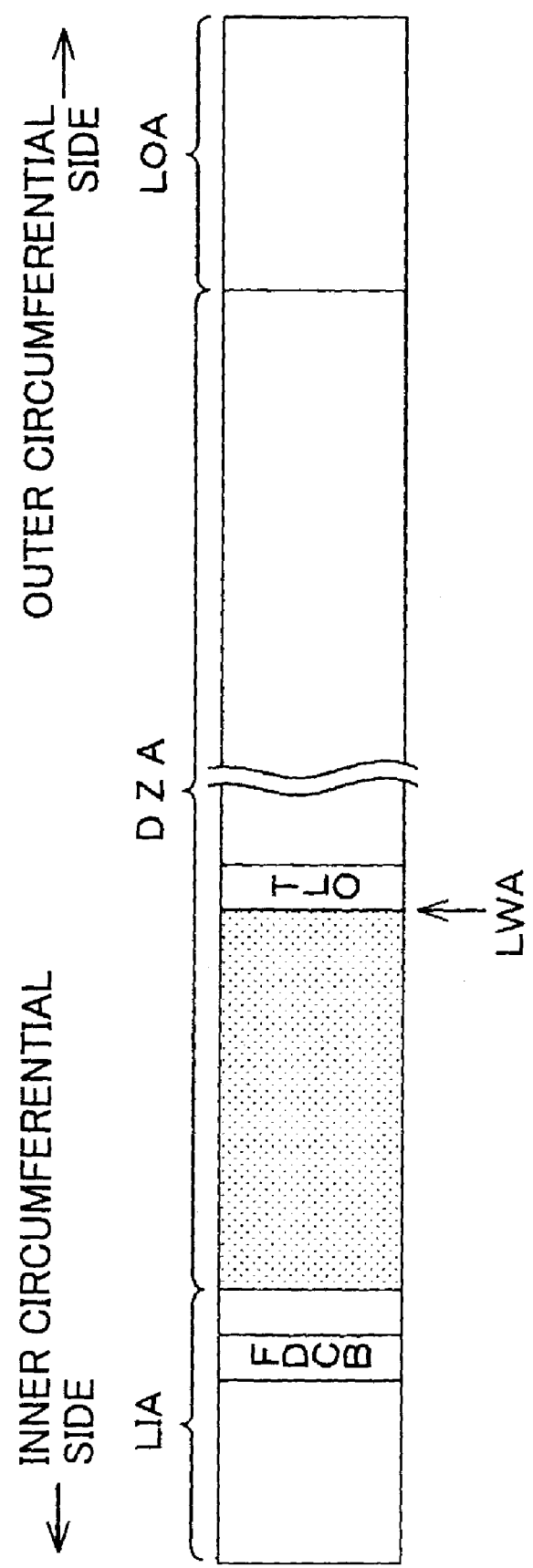
FIG. 6 is a diagram for explaining a structure of the recorded area in FIG. 2 in a state in which data are recorded during the operation in FIG. 4 and FIG. 5.

At step S433, the optical disc apparatus 20 performs a format interrupt process. Namely, if there is an unrecorded area between the last written address (LWA), which is the most outer circumferential address of the recorded area being occupied by the user data, and the head address of the DZA, the optical disc apparatus 20 records dummy data in the unrecorded area. In addition, the optical disc apparatus 20 updates the FDCB in the LIA and records a temporary lead-out (TLO) immediately following the LWA as illustrated in FIG. 6. As a result, it is possible to maintain compatibility with a DVD-ROM. After completion of the format interrupt process, the optical disc apparatus 20 terminates the operation that responds to the receipt of the format request command from the host.

On the other hand, if the ejection request flag is set as "1" at step S411, the optical disc apparatus 20 determines that the ejection is requested (step S411: Y) and moves to step S435.

At step S435, after resetting the ejection request flag as "0", the optical disc apparatus 20 informs the host of error information so as to prompt the host to issue a format interrupt request and then returns to step S409.

On the other hand, if the write request flag or the read request flag is set as "1" at step S413, the optical disc apparatus 20 determines that the optical disc apparatus 20 is requested to perform a recording process or reproducing process for the optical disc 21 (step S413: Y) and then moves to step S417.

At step S417, the optical disc apparatus 20 interrupts the disc initialization and then moves to step S419.

At step S419, the optical disc apparatus 20 refers to the write request flag, and if the write request flag is set as "1", the optical disc apparatus 20 determines that the optical disc apparatus 20 is requested to record data (step S419: Y) and moves to step S421.

At step S421, after resetting the write request flag as "0", the optical disc apparatus 20 records given user data in a designated area in the DZA. After recording the user data, the optical disc apparatus 20 moves to step S423.

On the other hand, if the write request flag is not set as "1", the optical disc apparatus determines that the optical disc apparatus 20 is not requested to record data (step S419: N), that is, the optical disc apparatus 20 determines that the optical disc apparatus 20 is requested to reproduce user data in the optical disc 21, and then moves to step S425.

At step S425, after resetting the read request flag as "0", the optical disc apparatus 20 reproduces the user data recorded in an area designated by the host and transfers the designated user data to the host. The reproduction process of the optical disc apparatus 20 is described in detail below. After reproducing the designated user data, the optical disc apparatus moves to step S423.

At step S423, the optical disc apparatus restarts the disc initialization and moves to step S427.

At step S427, if the disc initialization is completed (step S427: Y), the optical disc apparatus 20 moves to step S451 (FIG. 5).

At step S451, the optical disc apparatus 20 determines whether or not a format interrupt is requested by the host. For this determination, the optical disc apparatus 20 refers to the format interrupt request flag, and if the format interrupt request flag is not set as "1", the optical disc apparatus 20 determines that the format interrupt is not requested (step S451: N) and moves to step S453.

At step S453, the optical disc apparatus determines whether or not the optical disc apparatus 20 is requested to eject the optical disc 21. For this determination, the optical disc apparatus 20 refers to the ejection request flag, and if the ejection request flag is set as "0", the optical disc apparatus 20 determines that the ejection is not requested (step S453: N) and moves to step S455.

At step S455, the optical disc apparatus 20 determines whether or not the optical disc 21 has been formatted. For this determination, the optical disc apparatus 20 determines whether or not there is an unrecorded area in the DZA, and if the DZA has an unrecorded area, the optical disc apparatus 20 determines that the optical disc 21 has not been completely formatted, and the optical disc 21 currently stays in the status of a blank disc. Therefore, the optical disc apparatus 20 determines that formatting of the optical disc 21 is not completed (step S455: N) and moves to step S457.

At step S457, the optical disc apparatus 20 determines whether or not the optical disc apparatus 20 is requested to record and reproduce data in the optical disc 21 by the host. For this determination, the optical disc apparatus 20 refers to the write request flag and the read request flag, and if both of the write request flag and the read request flag are set as "0"s, the optical disc apparatus 20 determines that the optical disc apparatus 20 has not received the write request or the read request for the optical disc 21 (step S457: N) and moves to step S459.

At step S459, the optical disc apparatus 20 formats the optical disc 21. Namely, for example, the optical disc apparatus 20 records 16 sectors of dummy data in a unrecorded area in the DZA and returns to step S451.

In order to format the optical disc 21, the optical disc apparatus 20 repeats the above-mentioned steps S451, S453, S455 and S457 until these steps are satisfied.

On the other hand, if the format interrupt request flag is set as "1" at step S451, the optical disc apparatus 20 determines that the format interrupt is requested (step S451: Y) and moves to step S471.

At step S471, the optical disc apparatus 20 performs a format interrupt process. Namely, if there is an unrecorded area between the LWA and the head address of the DZA, the optical disc apparatus 20 records dummy data in the unrecorded area. In addition, the optical disc apparatus 20 updates the FDCB in the LIA and records the TLO immediately following the LWA. As a result, it is possible to maintain compatibility with a DVD-ROM. After completion of the format interrupt process, the optical disc apparatus 20 terminates the operation that responds to the receipt of the format request command from the host.

On the other hand, if the ejection request flag is set as "1" at step S453, the optical disc apparatus 20 determines that the ejection is requested at step S453 (step S453: Y) and moves to step S473.

At step S473, after resetting the ejection request flag as "0", the optical disc apparatus 20 informs the host of error information so as to prompt the host to issue a format interrupt request and then returns to step S451.

On the other hand, if the formatting of the optical disc 21 is completed at step S455, the optical disc apparatus 20 determines that the optical disc 21 has been formatted (step S455: Y). In this case, the optical disc apparatus 20 records predetermined information in the initial zone, the inner disc test zone and the inner drive test zone in the LIA. After updating the FDCB, the optical disc apparatus 20 terminates the operation that responds to the receipt of the format request command from the host.

On the other hand, if the write request flag or the read request flag is set as "1" at step S457, the optical disc apparatus 20 determines that the optical disc apparatus 20 has received the write request or the read request for the optical disc 21 (step S457: Y) and moves to step S461.

At step S461, the optical disc apparatus 20 refers to the write request flag, and if the write request flag is set as "1", the optical disc apparatus 20 determines that the optical disc apparatus 20 has received a write request (step S461: Y) and moves to step S463.

At step S463, after resetting the write request flag as "0", the optical disc apparatus 20 records given user data in a designated area in the DZA. After recording the user data, the optical disc apparatus 20 returns to step S451.

On the other hand, if the write request flag is not set as "1" at step S461, the optical disc apparatus 20 determines that the optical disc apparatus 20 has not received any write request (step S461: N), that is, the optical disc apparatus determines that the optical disc apparatus 20 has received a read request, and moves to step S465.

At step S465, after resetting the read request as "0", the optical disc apparatus 20 reproduces user data recorded in an area designated by the host and transfers the designated user data to the host. After completion of reproducing the designated user data, the optical disc apparatus 20 returns to step S451.

A description will now be given, with reference to FIG. 7, of an operation of the optical disc apparatus 20 in response to receipt of an FDCB request command from the host for requesting FDCB information of the optical disc 21. In response to the receipt of the FDCB request command, the optical disc apparatus 20 sets the head address of a program corresponding to a procedure illustrated in FIG. 7 to a program counter of the CPU 40 and then starts execution of the program.

Figure 7:
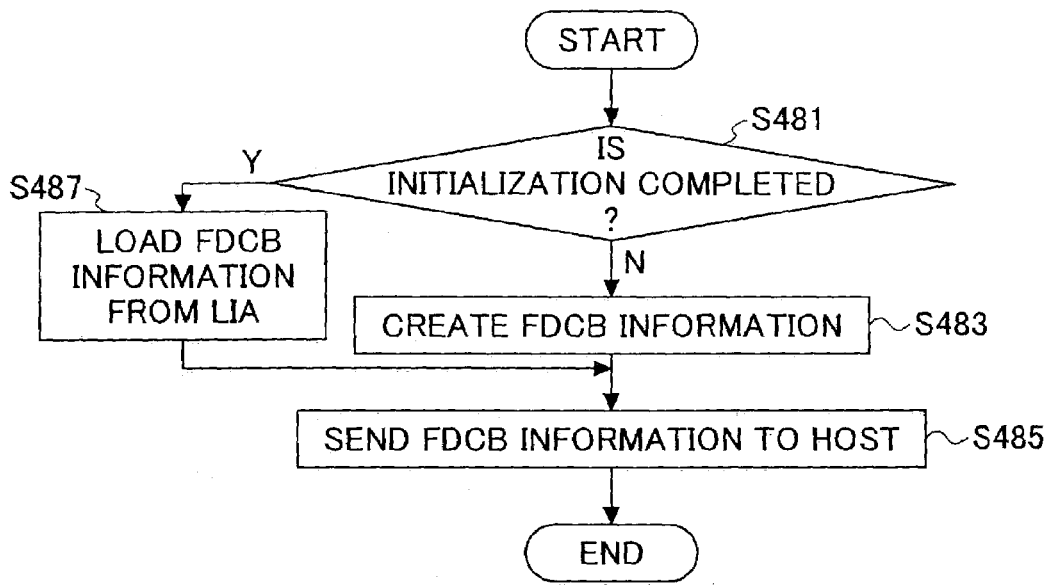
FIG. 7 is a flowchart of an operation of the optical disc apparatus according to the first embodiment of the present invention in response to receipt a FDCB information request command.

FIG. 7 is a flowchart of an exemplary operation of the optical disc apparatus 20 in response to receipt of the FDCB request command. Referring to FIG. 7, the optical disc apparatus 20 determines whether or not disc initialization for the optical disc 21 is completed at step S481. For this determination, the optical disc apparatus 20 determines whether or not predetermined management information is recorded in the addresses 02DC80 through 030000. If there is an unrecorded area in the addresses 02DC80 through 030000, the optical disc apparatus 20 determines that the disc initialization is not completed (step S481: N) and moves to step S483.

At step S483, the optical disc apparatus 20 creates FDCB information to be sent to the host and moves to step S485.

At step S485, the optical disc apparatus 20 delivers the created FDCB information to the host and then terminates the operation that responds to the receipt of the FDCB request command.

On the other hand, if the predetermined management information is recorded in the addresses 02DC80 through 030000 at step S481, the optical disc apparatus 20 determines that the disc initialization is completed (step S481: Y) and moves to step S487.

At step S487, the optical disc apparatus 20 loads the FDCB information from the LIA and moves to step S485.

At step S485, the optical disc apparatus 20 delivers the loaded FDCB information to the host and then terminates the operation that responds to the receipt of the FDCB request command.

A description will now be given of a recording process performed by the optical disc apparatus 20.

The CPU 40 generates a control signal for controlling rotation of the spindle motor 22 based on a designated recording speed and supplies the generated control signal to the motor driver 27. At the same time, the CPU 40 informs the reproduction signal processing circuit 28 that the CPU 40 has received a write request command from the host. In addition, the CPU 40 instructs the buffer manager 37 to store user data received from the host in the buffer RAM 34.

When the rotational speed of the optical disc 21 reaches a predetermined linear speed, the reproduction signal processing circuit 28 extracts a tracking error signal and a focusing error signal based on an output signal of the receiver of the optical pickup device 23 and supplies the extracted signals to the servo controller 33. The servo controller 33 drives the focusing actuator and the tracking actuator of the optical pickup device 23 via the motor driver 27 based on the focusing error signal and the tracking error signal so as to correct a misaligned focusing position and a misaligned tracking position, respectively. Also, the reproduction signal processing circuit 28 obtains ADIP information based on an output signal of the receiver of the optical pickup device 23 and then sends the CPU 40 the ADIP information.

Based on the ADIP information, the CPU 40 supplies a control signal for controlling the seek motor of the optical pickup device 23 to the motor driver 27 so that the optical pickup device 23 can be located at the writing start position thereof. When the CPU receives from the buffer manager 37 notification that the amount of user data accumulated in the buffer RAM 34 exceeds a predetermined data amount, the CPU 40 instructs the encoder 25 to generate a write signal. In addition, when the CPU 40 determines that the optical pickup device 23 is placed at the writing start position based on the ADIP information, the CPU 40 informs the encoder 25 of this fact. In this fashion, the optical disc apparatus 20 is ready to record the user data in the optical disc 21 via the encoder 25, the laser control circuit 24 and the optical pickup device 23.

A description will now be given of a reproducing process performed by the optical disc apparatus 20.

The CPU 40 generates a control signal for controlling rotation of the spindle motor 22 based on a designated reproducing speed and supplies the control signal to the motor driver 27. At the same time, the CPU 40 informs the reproduction signal processing circuit 28 that the CPU 40 has received a read request command. As in the above-explained recording process, the reproduction signal processing circuit 28 corrects a misaligned focusing position and a misaligned tracking position and informs the CPU 40 of ADIP information.

The CPU 40 generates a control signal for controlling the seek motor of the optical pickup device 23 so that the optical pickup device 23 can be located at the writing start position based on the ADIP information and supplies the control signal to the motor driver 27. Then, when the CPU 40 determines that the optical pickup device 23 is placed at the reading start position based on the ADIP information, the CPU 40 informs the reproduction signal processing circuit 28 of this fact.

The reproduction signal processing circuit 28 extracts an RF signal from an output signal of the receiver of the optical pickup device 23. After performing a decoding process and an error correction process, the reproduction signal processing circuit 28 stores the resulting signal as reproduction data in the buffer RAM 34. The reproduction data are accumulated in the buffer RAM 34 until the reproduction data become sector data. After the accumulation of the reproduction data is completed, the reproduction data are delivered to the host via the interface 38.

Here, until the recording process and the reproducing process are terminated, the reproduction signal processing circuit 28 is extracting a focusing error signal and a tracking error signal from an output signal of the receiver of the optical pickup device 23 and is correcting a misaligned focusing position and a misaligned tracking position via the servo controller 33 and the motor driver 27.

In the first embodiment of the present invention, the optical disc apparatus comprises a termination information output part, an initialization part, a response part, an initialization interrupt part, a user data recording part and an initialization restart part. These components are implemented through execution of the first recording control program, which is installed in the ROM 39 and is coded based on the above-mentioned procedure in FIG. 4, FIG. 5 and FIG. 7, by the CPU 40 as a control unit of the optical disc apparatus 20. Specifically, the termination information output part is implemented through step S401 in FIG. 4, the initialization part is implemented through step S407 in FIG. 4, the initialization interrupt part is implemented through step S417 in FIG. 4, the user data recording part is implemented through step S405 in FIG. 4, the initialization restart part is implemented through step S423 in FIG. 4, and the response part is implemented through steps S483 and S485 in FIG. 7. However, the present invention is not limited to this embodiment. For example, although the above-mentioned components are implemented as the processes that follow the program executed by the CPU 40, at least one of the components may be implemented as a hardware component.

Also, in the first embodiment of the present invention, an inventive information recording method comprises a first step, a second step, a third step, a fourth step and a fifth step. The first step is implemented through step S401 in FIG. 4, the second step is implemented through step S407 in FIG. 4, the third step is implemented through step S483 in FIG. 7, the fourth step is implemented through step S417 in FIG. 4, and the fifth step is implemented through step S423 in FIG. 4.

According to one aspect of the first embodiment of the present invention, if the optical disc 21 is a DVD+RW, the optical disc apparatus 20 informs the host that the optical disc 15 has been formatted immediately after receipt of a format request command. Accordingly, even if the optical disc 21 is a blank disc, the optical disc apparatus 20 is capable of recording given user data immediately after loading of the optical disc 21 in the optical disc apparatus 20. As a result, it is possible to reduce waiting time required for the optical disc apparatus 20 to be ready to record the user data in the optical disc 21.

Additionally, according to one aspect of the first embodiment of the present invention, if the optical disc apparatus 20 receives a write request command from the host during disc initialization, the optical disc apparatus 20 interrupts the disc initialization and starts a recording process. As a result, the optical disc apparatus 20 can record given user data immediately in response to the receipt of the write request. Hence, it is possible to reduce waiting time required for the optical disc apparatus 20 to be ready to record the user data in the optical disc 21.

Additionally, according to one aspect of the first embodiment of the present invention, while the optical disc apparatus 20 has no write request, the optical disc apparatus 20 performs disc initialization. Accordingly, it is possible to efficiently initialize the optical disc 21.

Additionally, according to one aspect of the first embodiment of the present invention, if disc initialization is not completed at receipt time of an FDCB request command, the optical disc apparatus 20 creates FDCB information and supplies the FDCB information to the host. As a result, even if the disc initialization is performed as a background process, it is possible to provide proper disc information to the host at any time.

Additionally, according to one aspect of the first embodiment of the present invention, even if the optical disc apparatus 20 receives a format interrupt request command before completion of disc initialization, the optical disc apparatus 20 does not start a format interrupt process until the disc initialization is completed. Accordingly, the optical disc apparatus can reliably complete the disc initialization.

As mentioned above, when receiving an ejection request command before completion of formatting of the optical disc 21, the optical disc apparatus 20 according to the first embodiment sends error information to the host so as to prompt the host to issue an interrupt of the formatting. However, if an ejection request is received via an ejection switch of the optical disc apparatus 20, the optical disc apparatus 20 may deal with the ejection request similarly to a format interrupt request command.

Also, the first recording control program according to the first embodiment of the present invention is recorded in the ROM 39. However, the first recording control program may be recorded in other types of recording media such as a CD-ROM, a magneto optical disc, a flash memory and a flexible disc. In this case, a drive device corresponding to a selected recording medium is provided to the optical disc apparatus 20, and the first recording control program is installed via the drive device. In other words, the first recording control program may be stored in an arbitrary recording medium as long as the first recording control program can be adequately loaded in the main memory of the CPU 40 for execution.

A description will now be given of an optical disc apparatus according to a second embodiment of the present invention.

The optical disc apparatus of the second embodiment has the same configuration as the optical disc apparatus according to the first embodiment except that the optical disc apparatus according to the second embodiment handles the optical disc 21 in compliance with a DVD+R standard. The optical disc apparatus according to the second embodiment operates in accordance with a second recording control program stored in the ROM 39. In the following, a difference between the optical disc apparatuses according to the two embodiments is intensively described. In the second embodiment, the same parts as those of the first embodiment are designated by the same reference numerals and a description thereof is omitted.

Similarly to a DVD+RW, a LIA, as illustrated in FIG. 3, occupies the addresses 01D830 through 030000 and comprises 12 zones: an initial zone, an inner disc test zone, an inner drive test zone, a guard zone 1, a reserved zone 1, a reserved zone 2, an inner disc identification zone, a reserved zone 3, a reference code zone, a buffer zone 1, a control data zone and a buffer zone 2.

In DVD+R, a multiple session system and a multi-track recording system are adopted, and therefore a data recording state of a DVD+R is managed by units of one track. For this reason, a session disc control block (SDCB), which contains information regarding each track in one session of a DVD+R, is stored in the inner disc identification zone.

Also, data are not allowed to be overwritten in a DVD+R. Accordingly, whenever an additional track is provided in a DVD+R, SDBC of the additional track is recorded in the inner disc identification zone. Here, the inner disc identification zone has 16 areas for storing SDCB. Thus, at most 16 tracks are allowed to be recorded in one session.

Also, physical format information, which contains start address information and last address information of a data area of a DVD+R, is recorded in the control data zone similarly to a DVD+RW.

A description will now be given, with reference to FIG. 8, of an operation of the optical disc apparatus 20 according to the second embodiment of the present invention in response to receipt of a write request command from the host. In response to receipt of a write request command, the optical disc apparatus 20 sets the head address of the second recording control program corresponding to the flowchart in FIG. 8 to a program counter of the CPU 40 and starts the operation that responds to the receipt of the write request command.

Figure 8:
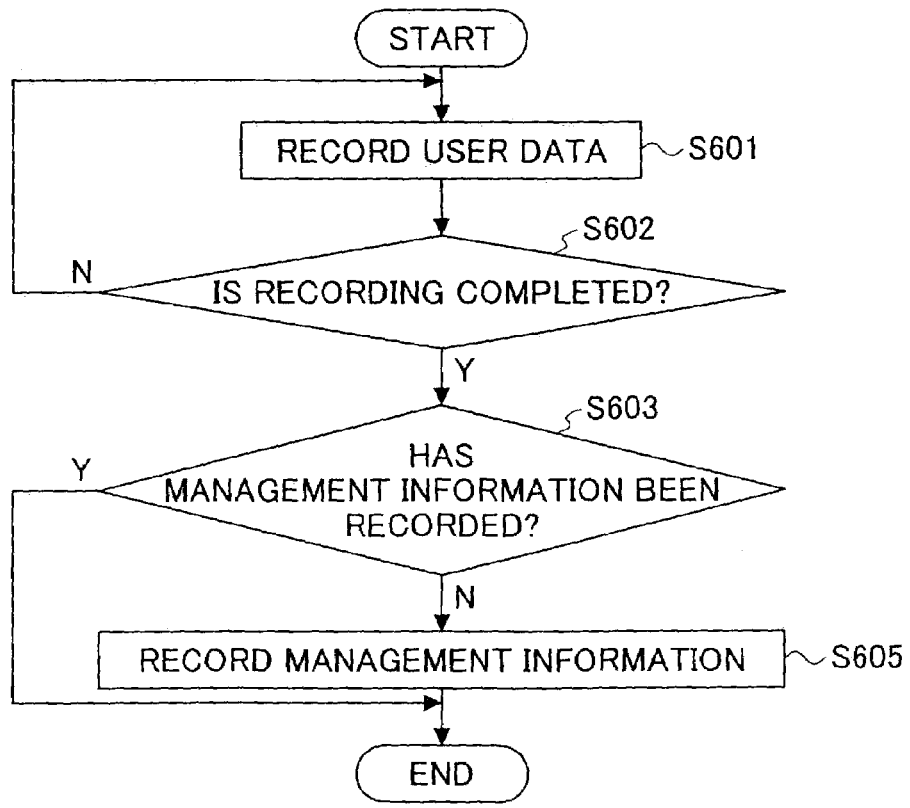
FIG. 8 is a flowchart of an operation of an optical disc apparatus according to a second embodiment of the present invention in response to a write request command.

FIG. 8 is a flowchart of an exemplary operation of the optical disc apparatus 20 in response to receipt of a write request command. Referring to FIG. 8, the optical disc apparatus 20 starts to record given user data in an area designated by the host at step S601 and moves to step S602.

At step S602, the optical disc apparatus determines whether or not the user data have been recorded. If the recording of the user data is not completed, the optical disc apparatus 20 determines that the user data have not been recorded (step S602: N) and returns to step S601. On the other hand, if the recording of the user data is completed, the optical disc apparatus 20 determines that the user data have been recorded (step S602: Y) and moves to step S603.

At step S603, the optical disc apparatus 20 determines whether or not predetermined management information has been recorded in the LIA of the optical disc 21. For this determination, the optical disc apparatus 20 determines whether or not the management information has been recorded in the reserved zone 2 and a portion of the inner disc identification zone. If the recording of the management information is not completed, the optical disc apparatus 20 determines that the management information has not been recorded (step S603: N) and moves to step S605.

At step S605, the optical disc apparatus 20 records the management information in the reserved zone 2 and the portion of the inner disc identification zone. After completion of the recording of the management information, the optical disc apparatus 20 terminates the operation that responds to receipt of the write request command.

On the other hand, if the recording of the management information is completed at step S603, the optical disc apparatus 20 determines that the management information has been recorded (step S603: Y) and terminates the operation that responds to receipt of the write request command.

Here, the remaining management information is recorded in the LIA in accordance with a predetermined recording format when the optical disc apparatus 20 receives a session close request from a user.

A description will now be given, with reference to FIG. 9, of an operation of the optical disc apparatus 20 according to the second embodiment of the present invention in response to receipt of a SDCB request command for requesting SDCB information of the optical disc 21. In response to receipt of the SDCB request command, the optical disc apparatus 20 sets the head address of a program corresponding to a flowchart in FIG. 9 to a program counter of the CPU 40 and starts the operation.

FIG. 9 is a flowchart of an operation of the optical disc apparatus 20 in response to receipt of a SDCB information request command. Referring to FIG. 9, the optical disc apparatus 20 determines whether or not the latest management information has been recorded at step S651. If the recording of the latest management information is not completed, the optical disc apparatus determines that the latest management information has not been recorded (step S651: N) and moves to step S653.

At step S653, the optical disc apparatus 20 creates SDCB information to be sent to the host and moves to step S655.

At step S655, the optical disc apparatus 20 sends the created SDCB information to the host and terminates the operation that responds to receipt of the SDCB request command.

On the other hand, if the recording of the latest management information is completed, the optical disc apparatus 20 determines that the latest management information has been recorded (step S651: Y) and moves to step S657.

At step S657, the optical disc apparatus 20 reads SDCB information from the LIA of the optical disc 21 and moves to step S655.

At step S655, the optical disc apparatus 20 sends the read SDCB information to the host and terminates the operation that responds to receipt of the SDCB request command.

In the second embodiment of the present invention, the optical disc apparatus comprises a user data recording part, a management information recording part and a response part so as to perform a recording process and a reproducing process similarly to the first embodiment. These components are implemented through execution of the second recording control program, which is installed in the ROM 39 and is coded based on the above-mentioned procedure in FIG. 8 and FIG. 9, by the CPU 40 as a control unit of the optical disc apparatus 20. Specifically, the user data recording part is implemented through step S601 in FIG. 8, the management information recording part is implemented through step S605 in FIG. 8, and the response part is implemented through steps S653 and S655 in FIG. 9. However, the present invention is not limited to this embodiment. For example, although the above-explained components are implemented as the processes that follow the program executed by the CPU 40, at least one of the components may be implemented as a hardware component.

Also, in the second embodiment of the present invention, an inventive information recording method comprises a first step, a second step and a third step. Specifically, the first step is implemented through step S601 in FIG. 8, the second step is implemented through step S605 in FIG. 8, the third step is implemented through step S653 in FIG. 9.

According to one aspect of the second embodiment of the present invention, if the optical disc 21 is a DVD+R, the optical disc apparatus 20 performs the recording process for the optical disc 15 immediately after receipt of a write request command. Accordingly, even if the optical disc 21 is a blank disc, the optical disc apparatus 20 is capable of recording given user data immediately after loading of the optical disc 21 into the optical disc apparatus 20. As a result, it is possible to reduce waiting time required before the optical disc apparatus 20 is ready to record the user data in the optical disc 21.

Additionally, according to one aspect of the second embodiment of the present invention, if recording of the latest management information is not completed at receipt time of an SDCB request command, the optical disc apparatus 20 creates SDCB information and supplies the SDCB information to the host. As a result, even if the recording of the latest management information is performed as a background process, it is possible to provide proper disc information to the host at any time.

Here, the second recording control program according to the second embodiment of the present invention is recorded in the ROM 39. However, the second recording control program may be recorded in other types of recording media such as a CD-ROM, a magneto optical disc, a flash memory and a flexible disc. In this case, a drive device corresponding to a selected recording medium is provided to the optical disc apparatus 20, and the second recording control program is installed via the drive device. In other words, the second recording control program may be stored in an arbitrary recording medium as long as the second recording control program can be adequately loaded in the main memory of the CPU 40 for execution.

In the above-mentioned embodiments, the present invention is embodied as optical disc apparatuses that can record and reproduce information. However, the present invention is not limited to a specific type of optical disc apparatus. It is sufficient that the present invention can be embodied as an optical disc apparatus that can at least record information among a recording operation, a reproducing operation and a deleting operation.

Additionally, in the above-mentioned embodiments, a DVD+RW and a DVD+R are used as information recording media. However, the present invention is not limited to these information recording media. The present invention may handle an arbitrary information recording medium as long as management information has to be recorded in the information recording medium.

Additionally, in the above-mentioned embodiment, various types of request commands are issued by a host. However, the present invention is not limited to the embodiments. At least one of the request commands may be issued by request means provided in an information recorder. For instance, in a DVD recorder capable of recording video information, various request commands may be issued by a control device of the DVD recorder without being sent via a host.

The present invention is not limited to the specifically disclosed embodiments, and variations and modifications may be made without departing from the scope of the present invention.

What is claimed is:

1. A method of recording information in an information recording medium, the method comprising:
   a first step of outputting termination information indicative of termination of an initialization of an information recording medium before said initialization starts; and
   a second step of starting the initialization of the information recording medium at a predetermined timing after the output of the termination information.

2. The method as claimed in claim 1, wherein the initialization comprises a formatting process and the predetermined timing is a receipt time of a format interrupt request of the information recording medium.

3. The method as claimed in claim 1, wherein the predetermined timing is a receipt time of an ejection request of the information recording medium.

4. The method as claimed in claim 1, wherein the predetermined timing is a time at which access to the information recording medium is not requested.

5. The method as claimed in claim 1, further comprising:
   a third step of creating, in response to an initialization information request for requesting information regarding the initialization before completion of the initialization, the information in which a formatting status and a data recording status are described and providing the provisional information in response to the initialization information request.

6. The method as claimed in claim 1, further comprising:
   a fourth step of interrupting the initialization in response to a write request for recording user data in the information recording medium; and
   a fifth step of restarting the initialization after the user data have been recorded in the information recording medium.

7. The method as claimed in claim 1, wherein the second step records predetermined management information in a lead-in area of the information recording medium.

8. The method as claimed in claim 1, wherein the information recording medium complies with a DVD+RW standard.

9. An apparatus for recording information in an information recording medium, the apparatus comprising:
   a termination information output part outputting termination information indicative of termination of an initialization of an information recording medium before said initialization starts; and
   an initialization part starting the initialization of the information recording medium by recording predetermined initialization information in a predetermined area in the information recording medium at a predetermined timing after the output of the termination information.

10. The apparatus as claimed in claim 9, wherein the initialization request is issued by an external apparatus.

11. The apparatus as claimed in claim 9, further comprising:
   a response part, in response to the initialization information request before completion of the initialization, creating the information in which a formatting status and a data recording status are described and providing the provisional information in response to the initialization information request.

12. The apparatus as claimed in claim 11, wherein the initialization information request is issued by an external apparatus.

13. The apparatus as claimed in claim 9, further comprising:
   an initialization interruption part interrupting the initialization in response to a write request for recording user data in the information recording medium; and
   an initialization restart part restarting the initialization after the user data have been recorded in the information recording medium.

14. The apparatus as claimed in claim 13, wherein the write request is issued by an external apparatus.

15. A computer-readable recording medium for storing a program to cause a control computer of an information recorder to execute a procedure of recording information in an information recording medium, the procedure comprising:
   a first step of outputting termination information indicative of termination of an initialization of an information recording medium before said initialization starts; and
   a second step of starting the initialization of the information recording medium at a predetermined timing after the output of the termination information.

16. The computer-readable recording medium as claimed in claim 15, wherein the initialization comprises a formatting process and the predetermined timing is a receipt time of a format interrupt request of the information recording medium.

17. The computer-readable recording medium as claimed in claim 15, wherein the predetermined timing is a receipt time of an ejection request of the information recording medium.

18. The computer-readable recording medium as claimed in claim 15, wherein the predetermined timing is a time at which access to the information recording medium is not requested.

19. The computer-readable recording medium as claimed in claim 15, the procedure further comprising:
   a third step of creating, in response to an initialization information request for requesting information regarding the initialization before completion of the initialization, the information in which a formatting status and a data recording status are described and providing the provisional information in response to the initialization information request.

20. The computer-readable recording medium as claimed in claim 15, the procedure further comprising:
   a fourth step of interrupting the initialization in response to a write request for recording user data in the information recording medium; and
   a fifth step of restarting the initialization after the user data have been recorded in the information recording medium.

* * * * *